United States Patent [19]
Davis

[11] 4,217,011
[45] Aug. 12, 1980

[54] WATER SOFTENER CABINET

[75] Inventor: Stephen H. Davis, Dayton, Ohio

[73] Assignee: Water Refining Company, Inc., Middletown, Ohio

[21] Appl. No.: 964,575

[22] Filed: Nov. 28, 1978

[51] Int. Cl.² .................. B65D 7/00; A47B 83/00
[52] U.S. Cl. ............................ 312/237; 312/211; 220/4 R; 220/411
[58] Field of Search ............ 312/237, 284, 257 SK, 312/257 A, 257 SM, 100, 204, 211; 220/4 R, DIG. 25, 411, 413, 425, 446; 211/72; 24/256, 21

[56] References Cited

U.S. PATENT DOCUMENTS

| | | | |
|---|---|---|---|
| D. 159,534 | 8/1950 | Raichert | 312/204 |
| 1,833,904 | 12/1931 | Keys | 24/256 |
| 2,060,155 | 11/1936 | Wilhelm | 220/425 |
| 2,084,231 | 6/1937 | Watkins | 312/100 |
| 2,192,862 | 3/1940 | Eagley | 220/4 R |
| 2,530,910 | 11/1950 | Schnabel | 312/284 |
| 2,607,653 | 8/1952 | Fuerst | 312/211 |
| 2,620,940 | 12/1952 | Ginter | 220/4 R |
| 2,624,451 | 1/1953 | Ewing | 220/446 |
| 2,648,515 | 8/1953 | Weiss | 220/413 |
| 2,676,477 | 4/1954 | Smith | 220/4 R |
| 2,747,739 | 5/1956 | Bissonnette et al. | 24/256 |
| 2,777,610 | 1/1957 | Fox et al. | 312/284 |
| 3,805,988 | 4/1974 | Walker et al. | 220/411 |
| 4,003,613 | 1/1977 | Oakley | 312/257 A |

Primary Examiner—Victor N. Sakran
Attorney, Agent, or Firm—Biebel, French & Nauman

[57] ABSTRACT

A cabinet for enclosing a water softener system, which system includes a free standing resin tank, has a cylindrical brine tank side wall member, mounted on top of a horizontal cabinet base and forming a brine tank therewith. An integrally formed cabinet side wall member having a vertical front wall portion and a pair of vertical side wall portions extending rearwardly from the front wall portion is mounted on top of the base. The cabinet side wall member surrounds the brine tank on at least three sides of the brine tank and the side wall portion extends rearwardly beyond the brine tank by a distance sufficient to enclose substantially on at least three sides the free standing resin tank. A brine tank cover is mounted on top of the cabinet side wall member and defines an opening therein through which salt may be added to the brine tank.

17 Claims, 5 Drawing Figures

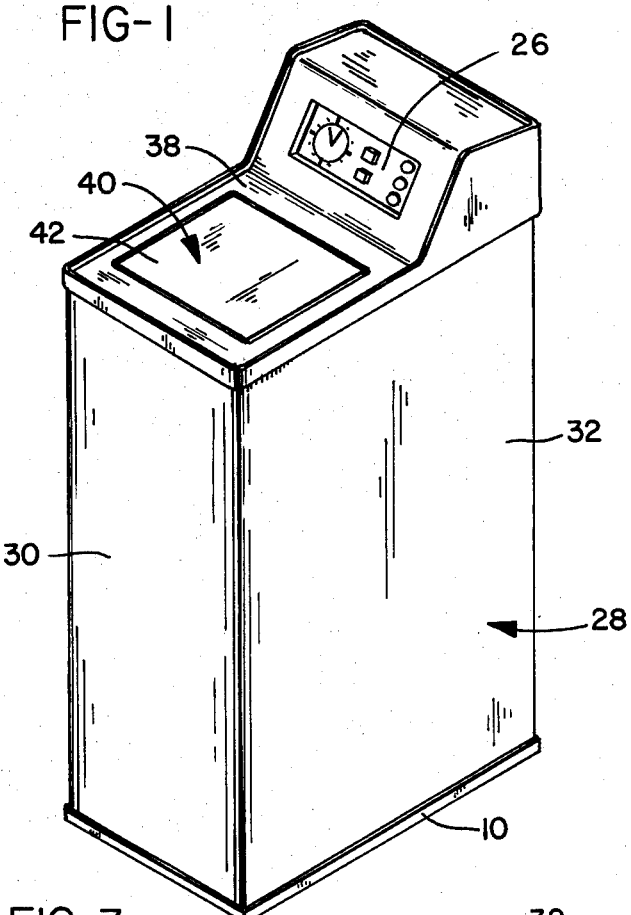
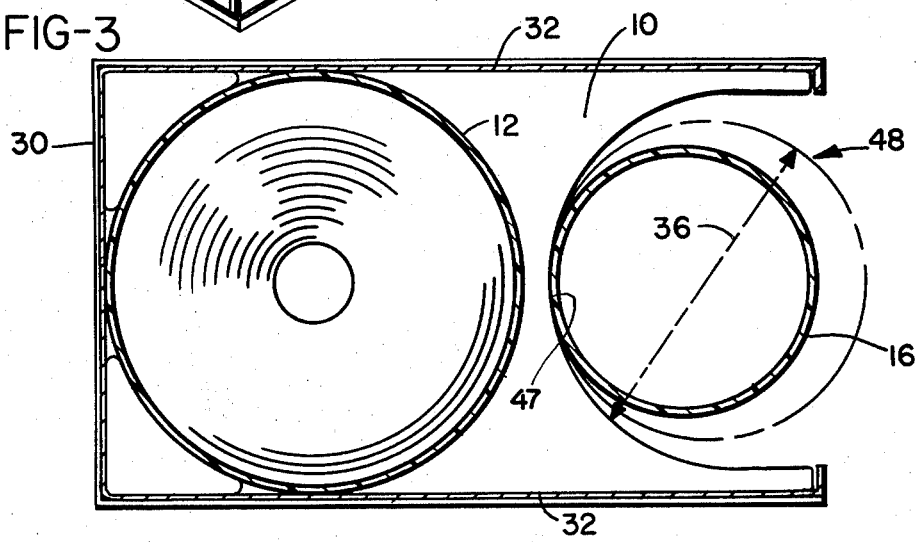

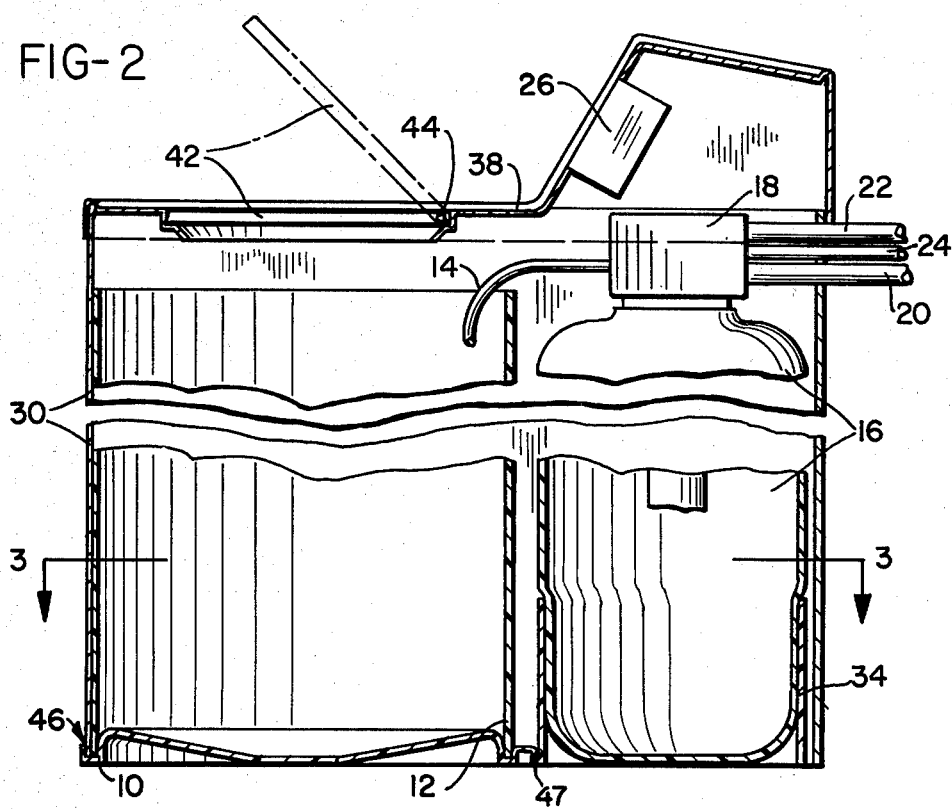

U.S. Patent  Aug. 12, 1980  Sheet 3 of 3  4,217,011
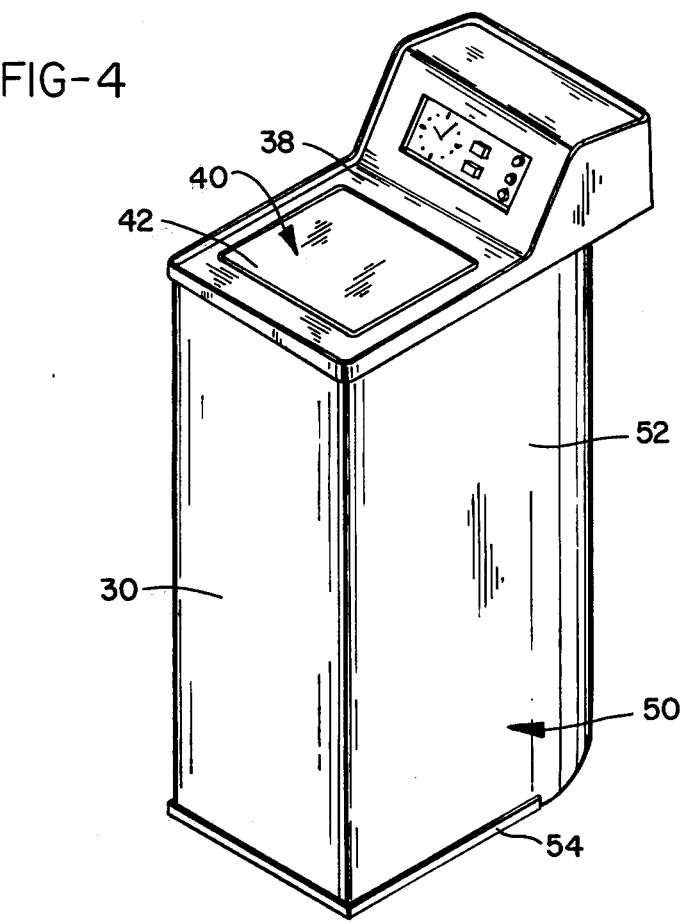
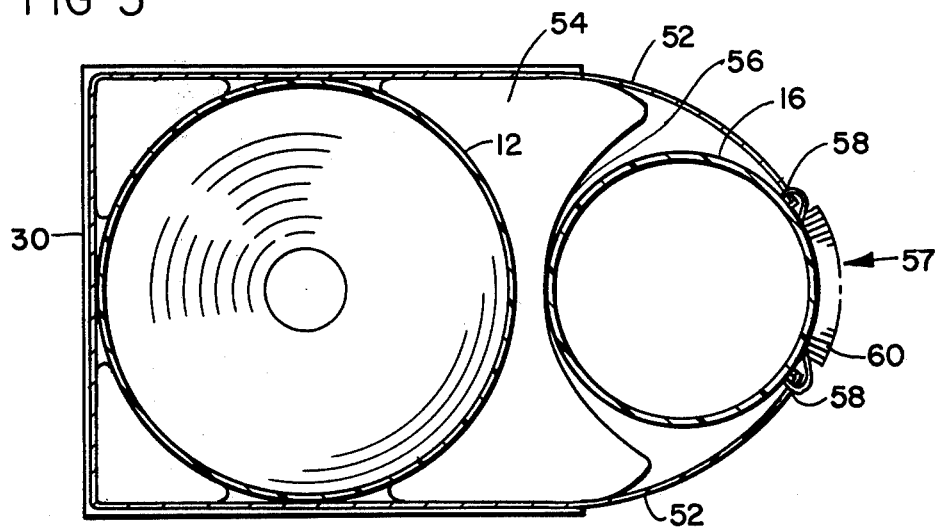

WATER SOFTENER CABINET

BACKGROUND OF THE INVENTION

The present invention relates to a cabinet and, more particularly, to a cabinet structure for enclosing a water softening system.

Water softeners suitable for home use typically include a resin tank which contains a quantity of water treating resin. Water supplied to the home passes through the resin tank where, by an ion exchange process, various metal ions are removed from the water, thus softening it. After a predetermined quantity of water has been treated by passing it through the resin tank, the resin must be reconditioned by a regeneration process to remove the metal ions from the resin. In order to regenerate the resin, a brine solution is circulated through the resin tank and therafter discharged into the drain system for the home. It is common for the brine solution to be stored in a brine storage tank. From time to time, the homeowner will place a quantity of salt pellets or crystals in the tank which will be dissolved by the water in the tank, thus forming the brine solution.

Two primary physical arrangements for home softener systems have been utilized in the past. In a first type of system, sometimes termed a "tank-in-tank" system, the resin tank is positioned within the brine tank. Such an arrangement provides a neat, attractive appearance, and if it is desirable that the softener be enclosed within a softener cabinet, as in the case where the softener is placed in an area in the home frequently seen by residents and visitors, only a single cabinet structure need be provided. The tank-in-tank type of system is somewhat disadvantageous, however, in that the resin tank will be connected to the plumbing system in the home, thereby rendering it immovable. When it is desired to clean the brine tank in such a system, therefore, it is not possible to move the brine tank outside the house, nor to tip the tank on its side for removal of foreign matter which has accumulated, without disconnecting the plumbing fittings associated with the softener valves. The only other way in which the brine tank may be cleaned is by means of a vacuum cleaner of the type capable of vacuuming liquids.

Another type of prior art softener system for home use includes separate tanks for storing brine solution and water treatment resin. The brine in such a system is typically withdrawn from the brine tank by means of a flexible plastic tube which is inserted into the tank and which is connected to the softener valve structure. A collar or foot extends around the lower portion of the resin tank to permit it to be free standing. This configuration, sometimes termed a "side-by-side" softener system, is advantageous in that the brine tank may be easily removed from the rest of the softener system and taken elsewhere for cleaning.

A side-by-side water softener system, however, does not present as pleasing an appearance as a tank-in-tank softener system. In the past, if a side-by-side system were to be enclosed within cabinetry, two cabinets would necessarily be required, one cabinet for the brine tank and a second cabinet for the resin tank. Clearly, such a dual cabinet arrangement is not aesthetically appealing, and further, adds an undesirable expense to the cost of the softener system. Additionally, since resin tanks vary in diameter, depending on the treatment capacity of the system, a number of cabinets of various sizes would have to be manufactured to accommodate the different resin tank diameters. In general, however, side-by-side units have not been installed within cabinets and, therefore, have been relegated to portions of the home, such as the basement or utility room, where the appearance of the units is not a significant drawback.

Accordingly, a need exists for a simply constructed aesthetically pleasing cabinet structure for housing the free standing resin tank and associated brine tank in a side-by-side softener system.

SUMMARY OF THE INVENTION

A cabinet for enclosing a water softening system, such system including a free standing resin tank containing a water treatment resin and brine tank for storage of brine solution which, when circulated through the resin tank, restores the water treatment efficacy of the resin, includes a horizontal cabinet base. A cylindrical brine tank side wall member is mounted on top of the base and forms a brine tank therewith. An integrally formed cabinet side wall member has a vertical front wall portion and a pair of vertical side wall portions which extend rearwardly from the front wall portion. The cabinet side wall member is mounted on top of the base such that the cabinet side wall member surrounds the brine tank on at least three sides of the brine tank. The side wall portions extend rearwardly beyond the brine tank by a distance sufficient to enclose substantially on at least three sides a free standing resin tank having a diameter less than a predetermined maximum tank diameter. A brine tank cover is mounted on top of the cabinet side wall member and defines an opening through which salt may be added to the brine tank.

The cabinet base may be bonded to the lower edges of the cabinet side wall member and the brine tank side wall member with the front wall portion and the side wall portions of the cabinet side wall member being bonded to the brine tank side wall member. The cabinet base may define grooves in the periphery thereof for receiving the lower edges of the front wall portion and the side wall portions.

In one embodiment, the rearward end of the cabinet base defines a tank receiving cutout such that the base extends rearwardly on both sides of the cutout by a distance sufficient to surround substantially on three sides the bottom portion of a free standing resin tank having a diameter less than a predetermined maximum tank diameter. The lower edges of the side wall portions are bonded to the cabinet base along substantially their entire extent.

In another embodiment, the side wall portions are formed of sufficiently flexible material such that the rearward ends of the side wall portions may be flexed inwardly to wrap around at least a portion of the periphery of the free standing resin tank. Latching means are provided for connection to the rearward ends of the side wall portions to urge said rearward ends together such that said side wall portions wrap around at least a portion of the periphery of the free standing resin tank. The side wall portions each define at least one opening adjacent the rearward ends thereof with the latching means including a coil spring for engaging the opening in each of the side wall portions and urging the rearward ends thereof together.

Accordingly, it is an object of the present invention to provide a cabinet for a water softening system including separate brine and resin tanks in which the cabinet encloses both such tanks, providing an aesthetically pleasing appearance; to provide such a cabinet in which the brine tank is integrally constructed with the cabinet; to provide such a cabinet in which the cabinet is adapted for enclosing a free standing resin tank having a diameter less than a predetermined maximum tank diameter.

BRIEF DESCRIPTION OF THE DRAWINGS

FIG. 1 is a perspective view showing one embodiment of the cabinet of the present invention;

FIG. 2 is a sectional view of the cabinet of FIG. 1 taken generally along a section line extending from the front of the cabinet to the rear;

FIG. 3 is a sectional view of the cabinet of FIGS. 1 and 2, taken generally along a line 3—3 in FIG. 2;

FIG. 4 is a perspective view of an alternative embodiment of the present invention; and FIG. 5 is a sectional view through the cabinet of FIG. 4, similar to FIG. 3.

DETAILED DESCRIPTION OF THE PREFERRED EMBODIMENTS

Reference is now made to FIGS. 1-3 which illustrate a cabinet for enclosing a water softening system embodying the present invention. Home water softening systems with which the present invention is used include a free standing resin tank which contains a water treatment resin, as well as a brine tank for storage of the brine solution. The brine solution is periodically circulated through the resin tank in what is known as a regeneration operation. By ion exchange, the metal ions previously removed from water during treatment are released from the resin and removed from the tank. The brine solution and metal ions are discharged into the drain system of the home in which the softener is installed.

As seen in FIGS. 1-3, the cabinet of the present invention includes a horizontal cabinet base 10. A cylindrical brine tank side wall member 12 is mounted on top of the base 10 and forms a brine tank therewith. As shown in FIG. 2, the bottom of the brine tank formed by member 12 and base 10 defines a slight slope toward the center of the tank.

Brine solution stored within the brine tank is withdrawn by means of flexible plastic tube 14 during the regeneration operation. Tube 14 may generally extend to the bottom of the brine tank and, in some softener systems, may terminate at an air check valve (not shown) which prevents air from being drawn into the tube 14. A softener valve arrangement 18, controls fluid flow in the regeneration operation, with the brine solution from the brine tank being circulated through the resin tank 16 and discharged through drain outlet 20. After regeneration, the softener valve arrangement 18 is actuated such that untreated water from line 22 is supplied to the resin tank 16 where it is treated prior to discharge through outlet line 24.

Control of the softener system operation and regeneration operation is provided by a softener control 26 of conventional design which may be either electromechanical or solid state. The construction and design of the softener control, the softener valve system, and the resin tank, are well known in the art and do not form a part of the present invention.

An integrally formed cabinet side wall member 28 includes a vertical front wall portion 30 and a pair of vertical side wall portions 32 which extend rearwardly from the front wall portion 30. The cabinet side wall member 28 is mounted on top of the cabinet base 10 such that the cabinet side wall member surrounds the brine tank formed by brine tank side wall member 12 and base 10 on at least three sides of the brine tank. The side wall portions 32 extend rearwardly beyond the brine tank by a distance sufficient to enclose substantially free standing resin tank 16 on at least three sides.

As seen in FIG. 2, resin tank 16 includes a collar 34 which supports the tank 16 permitting it to be free standing. As seen most clearly in FIG. 3, the cabinet of the present invention is arranged to enclose on at least three sides resin tanks of various sizes having diameters less than the maximum tank diameter 36. Thus a single cabinet structure may be utilized with softener systems of various capacities.

A brine tank cover 38 is mounted on top of the cabinet side wall member 28 and defines an opening 40. Lid 42 is pivotally attached to the cover 38 at hinge 44 and is opened to add salt to the brine tank through the opening 40, as necessary. The opening 40 is normally closed by lid 42 to prevent dust and other foreign material from accumulating in the brine tank.

The cabinet base 10 may be bonded to the lower edges of the cabinet side wall member 28, as well as to the brine tank side wall member 12, by means of an adhesive, such as epoxy. Additionally, the front wall portion 30 and the side wall portions 32 of the cabinet side wall member 28 may be adhesively bonded to the brine tank side wall member 12 along their tangential lines of contact. In order to increase the structural integrity of the cabinet, grooves 46 are defined in the cabinet base 10 along the periphery of the base for receiving the lower edges of the front wall portion 30 and the side wall portions 32.

As seen in FIG. 3 the rearward end of the cabinet base 10 defines rear surface 47 which abuts the side of the free standing resin tank 16. Base 10 defines a tank receiving cutout 48 such that the base 10 extends rearwardly on both sides of the cutout 48 by a distance which is sufficient to surround substantially on three sides the bottom portion of the free standing resin tank 16.

It will be appreciated that the cabinet of the present invention provides an attractive enclosure for a side-by-side softener system without reducing the advantages associated with such a system. When it is desired to clean the brine tank, the cover 38 is removed from the top of the side wall member 28 and the tube 14 is withdrawn from the brine tank. The balance of the cabinet structure may then be moved to another location for cleaning, since this structure is not structurally connected to the free standing resin tank 16. After the brine tank is cleaned, the brine tank is repositioned in front of the resin tank 16, as shown in FIGS. 1-3, the tube 14 reinserted into the brine tank, and the cover 38 placed on top of the cabinet side wall member 28.

FIGS. 4 and 5 which illustrate an alternative embodiment of the present invention in which the integrally formed cabinet side wall member 50 is formed of a flexible material, such as plastic or a thin sheet metal. The side wall portions 52 are flexed inwardly, as illustrated clearly in FIG. 5, to wrap around at least a portion of the periphery of the free standing resin tank 16. Because the side wall portions 52 are flexed in this manner, the horizontal cabinet base 54 does not define a substantial cutout portion, as in the embodiment of FIGS. 1–3, but only a curved rear surface 56 which abuts the bottom of the free standing resin tank 16.

A latching means 57 is provided for connection to the rearward ends of the side wall portions 52 to urge the ends together such that the side wall portions wrap around at least a portion of the periphery of the resin tank 16. As shown in FIG. 5, each side wall portion may define at least one opening 58 adjacent the rearward end thereof with the latching means including a coil spring 60 for engaging the openings 58 and urging the rearward ends of the side wall portions 52 together. If desired, the latching means 57 may include a number of such springs 60. It will be appreciated, of course, that various other latching mechanisms may be utilized in the cabinet structure of FIGS. 4 and 5 to join together the rearward ends of the side wall portions 52. The embodiment of FIGS. 4 and 5 provides generally the same aesthetically appealing appearance as that of the embodiment of FIGS. 1–3. Additionally, flexing of the side wall portions 52 may tend to shield the tank 16 from view to a greater extent, even when the cabinet structure is viewed from the side or rear.

It will be appreciated that the cabinet of the present invention may be manufactured of various materials in a number of ways. If a plastic material is used for fabrication of the cabinet, injection moding or extrusion techniques may be used. Further, the brine tank side wall member and the cabinet side wall member may be integrally formed in a single operation or, alternatively, individually formed and thereafter bonded together.

While the forms of apparatus herein described constitute preferred embodiments of the invention, it is to be understood that the invention is not limited to these precise forms of apparatus, and that changes may be made therein without departing from the scope of the invention.

What is claimed is:

1. A cabinet for enclosing a water softening system, said system including a free standing resin tank containing a water treatment resin and a brine tank for storage of a brine solution which, when circulated through said resin tank, restores the water treatment efficacy of the resin, comprising:
   a horizontal cabinet base defining a rear surface for abutting the side of said free standing resin tank,
   a cylindrical brine tank side wall member, mounted on top of said base and forming a brine tank therewith,
   an integrally formed cabinet side wall member having a vertical front wall portion and a pair of vertical side wall portions extending rearwardly from said front wall portion, said cabinet side wall member being mounted on top of said base such that said cabinet side wall member surrounds said brine tank on at least three sides of said brine tank, said side wall portions extending rearwardly beyond said rear surface of said cabinet base by a distance sufficient to enclose substantially on at least three sides a free standing resin tank having a diameter less than a predetermined maximum tank diameter, and
   a brine tank cover mounted on top of said cabinet side wall member and defining an opening therein through which salt may be added to said brine tank.

2. The cabinet of claim 1 in which said cabinet base is bonded to the lower edges of said cabinet side wall member and said brine tank side wall member, and in which said front wall portion and said side wall portions of said cabinet side wall member are bonded to said brine tank side wall member.

3. The cabinet of claim 1 in which said cabinet base defines grooves along the periphery thereof for receiving the lower edges of said front wall portion and said side wall portions.

4. The cabinet of claim 1 in which the rearward end of said cabinet base includes a tank receiving cutout defining said rear surface such that said base extends rearwardly on both sides of said cutout by a distance sufficient to surround substantially on three sides the bottom portion of a free standing resin tank having a diameter less than a predetermined maximum tank diameter.

5. The cabinet of claim 4 in which the lower edges of the side wall portions are bonded to said cabinet base along substantially their entire extent.

6. The cabinet of claim 1 in which said side wall portions are formed of sufficiently flexible material such that the rearward ends of said side wall portions may be flexed inwardly to wrap around at least a portion of the periphery of said free standing resin tank.

7. The cabinet of claim 6 further comprising latching means for connection to the rearward ends of said side wall portions to urge said rearward ends together such that said side wall portions wrap around at least a portion of the periphery of said free standing resin tank.

8. The cabinet of claim 7 in which said side wall portions each define at least one opening adjacent the rearward end thereof and in which said latching means comprises a coil spring for engaging said opening in each side wall portion and urging the rearward ends thereof together.

9. A cabinet for enclosing a water softening system, said system including a free standing floor supported resin tank containing a water treatment resin and a brine tank for storage of a brine solution which, when circulated through said resin tank, restores the water treatment efficacy of the resin, comprising:
   a cylindrical brine tank,
   an integrally formed cabinet side wall member having a vertical front wall portion and a pair of vertical side wall portions extending rearwardly from said front wall portion, said cabinet side wall member surrounding said brine tank on at least three sides of said brine tank and being attached thereto, said side wall portions extending rearwardly beyond said brine tank by a distance sufficient to enclose substantially on at least three sides a free standing floor supported resin tank having a diameter less than a predetermined maximum tank diameter, and
   a cover mounted on top of said cabinet side wall member and defining an opening therein through which salt may be added to said brine tank.

10. The cabinet of claim 9 further comprising a cabinet base attached to the lower edges of said cabinet side wall member, said base defining a rear surface for abutting the side of said free standing resin tank.

11. The cabinet of claim 9 in which said cover extends rearwardly a distance sufficient to cover said brine tank and said resin tank.

12. The cabinet of claim 9 in which said side wall portions are formed of sufficiently flexible material such that the rearward ends of said side wall portions may be flexed inwardly to wrap around at least a portion of the periphery of said free standing floor supported resin tank.

13. The cabinet of claim 12 further comprising latching means for connection to the rearward ends of said side wall portions to urge said rearward ends together such that said side wall portions wrap around at least a portion of the periphery of said free standing floor supported resin tank.

14. The cabinet of claim 13 in which said side wall portions each define at least one opening adjacent the rearward end thereof and in which said latching means comprises a coil spring for engaging said opening in each side wall portion and urging the rearward ends thereof together.

15. A cabinet for enclosing a water softening system, said system including a free standing floor supported resin tank containing a water treatment resin and a brine tank for storage of a brine solution which, when circulated through said resin tank, restores the water treatment efficacy of the resin, comprising:

a cylindrical brine tank, an integrally formed cabinet side wall member having a vertical front wall portion and a pair of vertical side wall portions extending rearwardly from said front wall portion, said cabinet side wall member surrounding said brine tank on at least three sides of said brine tank and being integrally formed therewith, said side wall portions extending rearwardly beyond said brine tank by a distance sufficient to enclose substantially on at least three sides a free standing floor supported resin tank having a diameter less than a predetermined maximum tank diameter, and a cover mounted on top of said cabinet side wall member and defining an opening therein through which salt may be added to said brine tank.

16. The cabinet of claim 15 further comprising a cabinet base attached to the lower edges of said cabinet side wall member and defining a rear surface for abutting the side of said free standing floor supported resin tank.

17. The cabinet of claim 15 in which said cover extends rearwardly a distance sufficient to cover said brine tank and said resin tank.

* * * * *